United States Patent
Deniau et al.

(10) Patent No.: US 9,024,743 B2
(45) Date of Patent: May 5, 2015

(54) APPARATUS AND METHOD FOR ACTIVATING A LOCALIZATION PROCESS FOR A TIRE PRESSURE MONITOR

(75) Inventors: Jean-Christophe Deniau, Fenton, MI (US); Brian J. Farrell, Troy, MI (US)

(73) Assignee: Continental Automotive System, Inc., Auburn Hills, MI (US)

( * ) Notice: Subject to any disclaimer, the term of this patent is extended or adjusted under 35 U.S.C. 154(b) by 157 days.

(21) Appl. No.: 13/206,336

(22) Filed: Aug. 9, 2011

(65) Prior Publication Data

US 2013/0038442 A1 Feb. 14, 2013

(51) Int. Cl.
*B60C 23/00* (2006.01)
*B60C 23/04* (2006.01)

(52) U.S. Cl.
CPC .......... *B60C 23/0455* (2013.01); *B60C 23/044* (2013.01); *B60C 23/0461* (2013.01); *B60C 23/0462* (2013.01); *B60C 23/0472* (2013.01); *B60C 23/0479* (2013.01); *B60C 23/0442* (2013.01)

(58) Field of Classification Search
CPC .......... B60R 2021/23107; B60R 2021/23161
USPC ................. 340/442, 443, 447; 73/146, 146.2, 73/146.3, 146.5
See application file for complete search history.

(56) References Cited

U.S. PATENT DOCUMENTS

| | | | |
|---|---|---|---|
| 2,428,089 A | 9/1947 | Mumma et al. | |
| 2,451,859 A | 10/1948 | Mumma et al. | |
| 3,777,062 A | 12/1973 | Ogawa | |
| 3,814,839 A | 6/1974 | Lubarsky et al. | |
| 3,814,840 A | 6/1974 | Lubarsky et al. | |
| 4,589,063 A | 5/1986 | Shah et al. | |
| 4,703,359 A | 10/1987 | Rumbolt | |
| 4,734,674 A | 3/1988 | Thomas et al. | |
| 4,737,761 A | 4/1988 | Dosjoub et al. | |
| 4,742,857 A | 5/1988 | Gandhi | |
| 4,774,511 A | 9/1988 | Rumbolt et al. | |
| 4,924,210 A | 5/1990 | Matsui et al. | |
| 4,959,810 A | 9/1990 | Darbee | |
| 4,999,622 A | 3/1991 | Amano et al. | |

(Continued)

FOREIGN PATENT DOCUMENTS

| | | |
|---|---|---|
| DE | 4492128 | 6/1996 |
| DE | 19503756 | 8/1996 |

(Continued)

OTHER PUBLICATIONS

Jeff Burgess, "Tire Pressure Monitoring System Reference Design", Tire Pressure Monitor System Demo, AN1951/D, Rev 1, May 2003, Motorola, Inc., 2003 (24 pgs.).

(Continued)

*Primary Examiner* — Paul Obiniyi

(57) ABSTRACT

A receiver device is tuned to monitor for first transmissions at a first time according to a first criterion and to monitor for second transmissions at a second time according to a second criterion. When the receiver device initially recognizes one of the first transmissions being transmitted according to the first criterion or the second transmissions being transmitted according to the second criterion, the recognized transmission is verified as being valid. When the transmission is recognized as valid, a transmission apparatus is activated to transmit an indication to a receiver so that a localization process can be executed.

20 Claims, 5 Drawing Sheets

(56) References Cited

U.S. PATENT DOCUMENTS

| | | | |
|---|---|---|---|
| 5,061,917 A | 10/1991 | Higgs et al. | |
| 5,196,682 A | 3/1993 | Englehardt | |
| 5,201,067 A | 4/1993 | Grube | |
| 5,223,844 A | 6/1993 | Mansel | |
| 5,228,077 A | 7/1993 | Darbee | |
| 5,231,872 A | 8/1993 | Bowler et al. | |
| 5,243,430 A | 9/1993 | Emmons | |
| 5,255,313 A | 10/1993 | Darbee | |
| 5,303,259 A | 4/1994 | Loveall | |
| 5,335,540 A | 8/1994 | Bowler et al. | |
| 5,365,225 A | 11/1994 | Bachhuber | |
| 5,414,761 A | 5/1995 | Darbee | |
| 5,434,572 A * | 7/1995 | Smith | 342/44 |
| 5,455,570 A | 10/1995 | Cook | |
| 5,515,052 A | 5/1996 | Darbee | |
| 5,537,463 A | 7/1996 | Escobosa | |
| 5,540,092 A * | 7/1996 | Handfield et al. | 73/146.5 |
| 5,552,917 A | 9/1996 | Darbee | |
| 5,562,787 A | 10/1996 | Koch et al. | |
| 5,564,101 A | 10/1996 | Eisfeld et al. | |
| 5,581,023 A * | 12/1996 | Handfield et al. | 73/146.5 |
| 5,585,554 A * | 12/1996 | Handfield et al. | 73/146.5 |
| 5,600,301 A | 2/1997 | Robinson, III | |
| 5,602,524 A | 2/1997 | Mock et al. | |
| 5,614,906 A | 3/1997 | Hayes | |
| 5,624,265 A | 4/1997 | Redford | |
| 5,661,651 A | 8/1997 | Geschke et al. | |
| 5,663,496 A | 9/1997 | Handfield et al. | |
| 5,698,353 A | 12/1997 | Jeong | |
| 5,706,247 A | 1/1998 | Merritt et al. | |
| 5,731,516 A * | 3/1998 | Handfield et al. | 73/146.5 |
| 5,731,763 A | 3/1998 | Herweck | |
| 5,741,966 A | 4/1998 | Handfield et al. | |
| 5,768,499 A | 6/1998 | Treadway et al. | |
| 5,808,558 A | 9/1998 | Meek et al. | |
| 5,838,229 A | 11/1998 | Robinson, III | |
| 5,841,390 A | 11/1998 | Tsui | |
| 5,844,131 A | 12/1998 | Gabelmann et al. | |
| 5,880,363 A | 3/1999 | Meyer et al. | |
| 5,883,305 A | 3/1999 | Jo et al. | |
| 5,900,808 A | 5/1999 | Lebo | |
| 5,926,087 A | 7/1999 | Busch et al. | |
| 5,959,751 A | 9/1999 | Darbee | |
| 5,963,128 A | 10/1999 | McClelland | |
| 5,965,808 A | 10/1999 | Normann et al. | |
| 6,002,450 A | 12/1999 | Darbee | |
| 6,005,486 A | 12/1999 | Fridley | |
| 6,011,463 A | 1/2000 | Cormier, Sr. | |
| 6,014,092 A | 1/2000 | Darbee | |
| 6,018,993 A | 2/2000 | Normann et al. | |
| 6,021,319 A | 2/2000 | Tigwell | |
| 6,034,597 A | 3/2000 | Normann et al. | |
| 6,078,270 A | 6/2000 | Shim | |
| 6,087,930 A | 7/2000 | Kulka et al. | |
| 6,112,165 A | 8/2000 | Uhl et al. | |
| 6,124,786 A | 9/2000 | Normann et al. | |
| 6,141,792 A | 10/2000 | Acker et al. | |
| 6,154,658 A | 11/2000 | Casi | |
| 6,155,119 A | 12/2000 | Normann et al. | |
| 6,169,480 B1 | 1/2001 | Uhl et al. | |
| 6,169,907 B1 * | 1/2001 | Chang et al. | 455/522 |
| 6,181,241 B1 | 1/2001 | Normann et al. | |
| 6,192,747 B1 | 2/2001 | Fennel | |
| 6,194,999 B1 | 2/2001 | Uhl et al. | |
| 6,201,819 B1 | 3/2001 | Luders | |
| 6,204,758 B1 | 3/2001 | Wacker et al. | |
| 6,208,341 B1 | 3/2001 | van Ee et al. | |
| 6,218,936 B1 | 4/2001 | Imao | |
| 6,259,361 B1 | 7/2001 | Robillard et al. | |
| 6,271,748 B1 | 8/2001 | Derbyshire et al. | |
| 6,275,148 B1 | 8/2001 | Takamura et al. | |
| 6,297,731 B1 | 10/2001 | Flick | |
| 6,298,095 B1 | 10/2001 | Kronestedt et al. | |
| 6,333,698 B1 | 12/2001 | Roddy | |
| 6,362,731 B1 | 3/2002 | Lill | |
| 6,369,703 B1 | 4/2002 | Lill | |
| 6,396,408 B2 | 5/2002 | Drummond et al. | |
| 6,400,263 B1 | 6/2002 | Kokubo | |
| 6,408,232 B1 | 6/2002 | Cannon et al. | |
| 6,438,467 B1 * | 8/2002 | Pacsai | 701/2 |
| 6,441,728 B1 | 8/2002 | Dixit et al. | |
| 6,445,286 B1 | 9/2002 | Kessler et al. | |
| 6,446,502 B1 | 9/2002 | Normann et al. | |
| 6,453,737 B2 | 9/2002 | Young et al. | |
| 6,463,798 B2 * | 10/2002 | Niekerk et al. | 73/146.2 |
| 6,469,621 B1 | 10/2002 | Vredevoogd et al. | |
| 6,477,165 B1 | 11/2002 | Kosco | |
| 6,486,773 B1 | 11/2002 | Bailie et al. | |
| 6,489,888 B1 | 12/2002 | Honeck et al. | |
| 6,490,452 B1 * | 12/2002 | Boscovic et al. | 455/436 |
| 6,507,306 B1 | 1/2003 | Griesau | |
| 6,518,891 B2 | 2/2003 | Tsutsui et al. | |
| 6,567,032 B1 | 5/2003 | Mullaly | |
| 6,571,617 B2 * | 6/2003 | Van Niekerk et al. | 73/146 |
| 6,612,165 B2 | 9/2003 | Juzswik et al. | |
| 6,622,552 B1 | 9/2003 | Delaporte | |
| 6,630,885 B2 | 10/2003 | Hardman et al. | |
| 6,633,229 B1 | 10/2003 | Normann et al. | |
| 6,662,642 B2 * | 12/2003 | Breed et al. | 73/146 |
| 6,667,687 B1 | 12/2003 | DeZori | |
| 6,681,164 B2 | 1/2004 | Bergerhoff et al. | |
| 6,693,522 B2 * | 2/2004 | Tang et al. | 340/445 |
| 6,705,155 B2 | 3/2004 | Katou | |
| 6,710,708 B2 | 3/2004 | McClelland et al. | |
| 6,731,205 B2 * | 5/2004 | Schofield et al. | 340/444 |
| 6,737,965 B2 | 5/2004 | Okubo | |
| 6,738,697 B2 * | 5/2004 | Breed | 701/31.5 |
| 6,747,590 B1 | 6/2004 | Weber | |
| 6,750,761 B1 | 6/2004 | Newman | |
| 6,774,778 B2 | 8/2004 | Lin | |
| 6,778,380 B2 | 8/2004 | Murray | |
| 6,788,193 B2 * | 9/2004 | King et al. | 340/447 |
| 6,794,993 B1 | 9/2004 | Kessler et al. | |
| 6,801,872 B2 | 10/2004 | Normann et al. | |
| 6,802,213 B1 * | 10/2004 | Agrotis | 73/146 |
| 6,804,999 B2 | 10/2004 | Okubo | |
| 6,822,603 B1 | 11/2004 | Crimmins et al. | |
| 6,828,905 B2 * | 12/2004 | Normann et al. | 340/447 |
| 6,832,573 B2 | 12/2004 | Evans et al. | |
| 6,871,157 B2 | 3/2005 | Lefaure | |
| 6,879,252 B2 | 4/2005 | DeZorzi et al. | |
| 6,885,282 B2 | 4/2005 | Desai | |
| 6,885,292 B2 | 4/2005 | Katou | |
| 6,885,293 B2 | 4/2005 | Okumura | |
| 6,885,296 B2 | 4/2005 | Hardman et al. | |
| 6,888,471 B2 | 5/2005 | Elsner et al. | |
| 6,897,770 B2 | 5/2005 | Lill | |
| 6,904,796 B2 | 6/2005 | Pacsai et al. | |
| 6,906,624 B2 | 6/2005 | McClelland et al. | |
| 6,910,627 B1 | 6/2005 | Simpson-Young et al. | |
| 6,914,523 B2 | 7/2005 | Munch et al. | |
| 6,915,146 B1 | 7/2005 | Nguyen et al. | |
| 6,915,229 B2 | 7/2005 | Taguchi et al. | |
| 6,919,798 B2 | 7/2005 | Ide | |
| 6,920,785 B2 | 7/2005 | Toyofuku | |
| 6,922,140 B2 | 7/2005 | Hernando et al. | |
| 6,927,679 B2 | 8/2005 | Taguchi et al. | |
| 6,941,803 B2 | 9/2005 | Hirohama et al. | |
| 6,972,671 B2 | 12/2005 | Normann et al. | |
| 6,983,649 B2 | 1/2006 | Katou | |
| 6,996,418 B2 * | 2/2006 | Teo et al. | 455/562.1 |
| 7,002,455 B2 | 2/2006 | Buck et al. | |
| 7,010,968 B2 | 3/2006 | Stewart et al. | |
| 7,015,801 B1 | 3/2006 | Juzswik | |
| 7,017,403 B2 | 3/2006 | Normann et al. | |
| 7,034,661 B2 | 4/2006 | Lonsdale et al. | |
| 7,039,397 B2 | 5/2006 | Chuey | |
| 7,042,348 B2 | 5/2006 | Schulze et al. | |
| 7,050,794 B2 | 5/2006 | Chuey et al. | |
| 7,084,749 B1 | 8/2006 | Honeck et al. | |
| 7,084,751 B2 | 8/2006 | Klamer | |
| 7,088,226 B2 | 8/2006 | McClelland et al. | |
| 7,095,316 B2 | 8/2006 | Kachouh et al. | |
| 7,096,003 B2 * | 8/2006 | Joao et al. | 455/406 |

(56) References Cited

U.S. PATENT DOCUMENTS

| | | | |
|---|---|---|---|
| 7,103,460 B1* | 9/2006 | Breed | 701/32.9 |
| 7,104,438 B2 | 9/2006 | Benedict | |
| 7,113,083 B2* | 9/2006 | Suitsu | 340/442 |
| 7,116,213 B2 | 10/2006 | Thiesen et al. | |
| 7,116,218 B2* | 10/2006 | Ogawa et al. | 340/447 |
| 7,120,430 B2 | 10/2006 | Christenson et al. | |
| 7,137,296 B2 | 11/2006 | Shida et al. | |
| 7,148,793 B2 | 12/2006 | Lin | |
| 7,161,466 B2 | 1/2007 | Chuey | |
| 7,161,476 B2 | 1/2007 | Hardman et al. | |
| 7,164,117 B2* | 1/2007 | Breed et al. | 250/221 |
| 7,173,520 B2 | 2/2007 | Desai et al. | |
| 7,224,269 B2 | 5/2007 | Miller et al. | |
| 7,243,535 B2 | 7/2007 | Shimura | |
| 7,254,994 B2 | 8/2007 | Schulze et al. | |
| 7,307,480 B2* | 12/2007 | Shiu et al. | 331/44 |
| 7,315,240 B2 | 1/2008 | Watabe | |
| 7,318,162 B2 | 1/2008 | Rineer et al. | |
| 7,369,491 B1 | 5/2008 | Beshai et al. | |
| 7,380,450 B2 | 6/2008 | Durif | |
| 7,414,523 B2 | 8/2008 | Li et al. | |
| 7,453,350 B2 | 11/2008 | Kachouh et al. | |
| 7,478,554 B2* | 1/2009 | Roth et al. | 73/146 |
| 7,508,762 B2 | 3/2009 | Ohtani | |
| 7,512,109 B2 | 3/2009 | Trott et al. | |
| 7,518,495 B2 | 4/2009 | Tang et al. | |
| 7,519,011 B2 | 4/2009 | Petrus et al. | |
| 7,535,841 B1 | 5/2009 | Beshai et al. | |
| 7,642,904 B2* | 1/2010 | Crano | 340/442 |
| 7,663,502 B2* | 2/2010 | Breed | 340/12.25 |
| 7,688,192 B2 | 3/2010 | Kenny et al. | |
| 7,697,497 B2* | 4/2010 | Grube et al. | 370/342 |
| 7,817,543 B2 | 10/2010 | Beshai et al. | |
| 7,884,707 B2 | 2/2011 | Wittliff et al. | |
| 7,885,603 B2 | 2/2011 | Santavicca | |
| 7,895,886 B2 | 3/2011 | Tozawa et al. | |
| 7,900,198 B2 | 3/2011 | Kasman | |
| 7,948,364 B2* | 5/2011 | Lin et al. | 340/442 |
| 8,013,725 B2* | 9/2011 | Murata et al. | 340/447 |
| 8,019,323 B2* | 9/2011 | Jheng et al. | 455/411 |
| 8,027,359 B2 | 9/2011 | Iwamura | |
| 8,031,598 B2 | 10/2011 | Beshai et al. | |
| 8,035,257 B2 | 10/2011 | Fornage | |
| 8,049,533 B1* | 11/2011 | Lin | 326/82 |
| 8,082,579 B2* | 12/2011 | Shimizu et al. | 726/12 |
| 8,155,617 B2* | 4/2012 | Magnusson et al. | 455/336 |
| 8,185,093 B2* | 5/2012 | Jheng et al. | 455/411 |
| 8,319,378 B2 | 11/2012 | Fornage | |
| 8,330,594 B2 | 12/2012 | Suzuki et al. | |
| 8,332,104 B2 | 12/2012 | Greer et al. | |
| 2001/0050611 A1 | 12/2001 | Achterholt | |
| 2002/0030592 A1 | 3/2002 | Laitsaari et al. | |
| 2002/0059825 A1 | 5/2002 | Lundqvist | |
| 2002/0067285 A1 | 6/2002 | Lill | |
| 2002/0075145 A1 | 6/2002 | Hardman et al. | |
| 2002/0084895 A1 | 7/2002 | Dixit et al. | |
| 2002/0086708 A1* | 7/2002 | Teo et al. | 455/561 |
| 2002/0121132 A1* | 9/2002 | Breed et al. | 73/146 |
| 2002/0126005 A1 | 9/2002 | Hardman et al. | |
| 2002/0130803 A1 | 9/2002 | Conway et al. | |
| 2002/0144134 A1* | 10/2002 | Watanabe et al. | 713/191 |
| 2002/0168795 A1 | 11/2002 | Schuumans | |
| 2002/0186320 A1 | 12/2002 | Carlsgaard | |
| 2002/0190852 A1 | 12/2002 | Lin | |
| 2003/0005759 A1* | 1/2003 | Breed et al. | 73/146 |
| 2003/0009270 A1* | 1/2003 | Breed | 701/29 |
| 2003/0030553 A1* | 2/2003 | Schofield et al. | 340/442 |
| 2003/0050070 A1* | 3/2003 | Mashinsky et al. | 455/452 |
| 2003/0071723 A1* | 4/2003 | Tang et al. | 340/445 |
| 2003/0079537 A1 | 5/2003 | Luce | |
| 2003/0080860 A1 | 5/2003 | Stewart et al. | |
| 2003/0080861 A1 | 5/2003 | Okubo | |
| 2003/0095553 A1 | 5/2003 | Shiomoto et al. | |
| 2003/0110851 A1 | 6/2003 | Tsujita | |
| 2003/0112138 A1 | 6/2003 | Marguet et al. | |
| 2003/0117276 A1 | 6/2003 | Marguet et al. | |
| 2003/0117277 A1 | 6/2003 | Marguet et al. | |
| 2003/0131297 A1 | 7/2003 | Fischel et al. | |
| 2003/0179082 A1 | 9/2003 | Ide | |
| 2003/0197594 A1 | 10/2003 | Olson et al. | |
| 2003/0197595 A1 | 10/2003 | Olson et al. | |
| 2003/0197603 A1 | 10/2003 | Stewart et al. | |
| 2003/0228879 A1 | 12/2003 | Witkowski | |
| 2004/0039509 A1* | 2/2004 | Breed | 701/45 |
| 2004/0041698 A1 | 3/2004 | Lin | |
| 2004/0061601 A1 | 4/2004 | Freakes | |
| 2004/0113765 A1 | 6/2004 | Suitsu | |
| 2004/0130442 A1* | 7/2004 | Breed et al. | 340/443 |
| 2004/0149025 A1 | 8/2004 | Toyofuku | |
| 2004/0172179 A1 | 9/2004 | Miwa | |
| 2004/0174246 A1 | 9/2004 | Mitchell | |
| 2004/0203370 A1 | 10/2004 | Luo et al. | |
| 2004/0215382 A1* | 10/2004 | Breed et al. | 701/45 |
| 2005/0039103 A1 | 2/2005 | Azenko et al. | |
| 2005/0046584 A1* | 3/2005 | Breed | 340/825.72 |
| 2005/0075145 A1 | 4/2005 | Dvorak et al. | |
| 2005/0104722 A1 | 5/2005 | Tang et al. | |
| 2005/0134446 A1 | 6/2005 | Stewart et al. | |
| 2005/0156722 A1* | 7/2005 | McCall et al. | 340/447 |
| 2005/0179530 A1* | 8/2005 | Stewart et al. | 340/447 |
| 2005/0192727 A1* | 9/2005 | Shostak et al. | 701/37 |
| 2005/0264405 A1 | 12/2005 | Ueda | |
| 2006/0001535 A1 | 1/2006 | Hafele et al. | |
| 2006/0006992 A1 | 1/2006 | Daiss et al. | |
| 2006/0012475 A1 | 1/2006 | Froitzheim et al. | |
| 2006/0017554 A1 | 1/2006 | Stewart et al. | |
| 2006/0022813 A1 | 2/2006 | Schulze et al. | |
| 2006/0025897 A1* | 2/2006 | Shostak et al. | 701/1 |
| 2006/0044125 A1 | 3/2006 | Pierbon | |
| 2006/0114107 A1 | 6/2006 | Kim et al. | |
| 2006/0145829 A1 | 7/2006 | Watabe | |
| 2006/0148456 A1 | 7/2006 | Chuey | |
| 2006/0152342 A1* | 7/2006 | Turner et al. | 340/10.2 |
| 2006/0161327 A1 | 7/2006 | Emmerich et al. | |
| 2006/0187014 A1 | 8/2006 | Li et al. | |
| 2006/0192661 A1 | 8/2006 | Geradiere | |
| 2006/0201241 A1 | 9/2006 | Durif | |
| 2006/0217850 A1 | 9/2006 | Geerlings et al. | |
| 2006/0235641 A1 | 10/2006 | Fink et al. | |
| 2006/0273889 A1 | 12/2006 | Schulze et al. | |
| 2007/0063814 A1 | 3/2007 | Olson et al. | |
| 2007/0069947 A1 | 3/2007 | Banet et al. | |
| 2007/0176736 A1 | 8/2007 | Chuey et al. | |
| 2007/0182531 A1 | 8/2007 | Kuchler | |
| 2007/0190993 A1 | 8/2007 | Chuey et al. | |
| 2007/0194898 A1 | 8/2007 | Fukumori | |
| 2007/0210920 A1 | 9/2007 | Panotopoulos | |
| 2007/0213951 A1* | 9/2007 | Van Eeden | 702/116 |
| 2007/0223484 A1 | 9/2007 | Crowle et al. | |
| 2007/0247294 A1 | 10/2007 | Baader et al. | |
| 2007/0279201 A1 | 12/2007 | Casey et al. | |
| 2008/0001729 A1* | 1/2008 | Kyllmann et al. | 340/445 |
| 2008/0024287 A1 | 1/2008 | Boyle et al. | |
| 2008/0037458 A1* | 2/2008 | Myszne | 370/319 |
| 2008/0062880 A1* | 3/2008 | Yew et al. | 370/235 |
| 2008/0080447 A1* | 4/2008 | Grube et al. | 370/342 |
| 2008/0094198 A1 | 4/2008 | Yu | |
| 2008/0100430 A1 | 5/2008 | Kochie et al. | |
| 2008/0141766 A1* | 6/2008 | Roth et al. | 73/146.5 |
| 2008/0143593 A1 | 6/2008 | Graziano et al. | |
| 2008/0165688 A1 | 7/2008 | Beshai et al. | |
| 2008/0173082 A1 | 7/2008 | Hettle et al. | |
| 2008/0177441 A1 | 7/2008 | Marlett et al. | |
| 2008/0205553 A1 | 8/2008 | Costello et al. | |
| 2008/0211672 A1 | 9/2008 | Pei | |
| 2008/0240283 A1 | 10/2008 | Iwamura | |
| 2008/0256260 A1* | 10/2008 | Magnusson et al. | 709/240 |
| 2008/0282965 A1* | 11/2008 | Crano | 116/34 R |
| 2008/0285507 A1* | 11/2008 | Mukherjee et al. | 370/329 |
| 2008/0320243 A1* | 12/2008 | Mitsuzuka et al. | 711/153 |
| 2009/0033478 A1 | 2/2009 | Deniau et al. | |
| 2009/0045930 A1 | 2/2009 | Fu | |
| 2009/0067854 A1* | 3/2009 | Yokogawa et al. | 398/202 |
| 2009/0070863 A1* | 3/2009 | Shimizu et al. | 726/7 |

(56) References Cited

U.S. PATENT DOCUMENTS

| | | | |
|---|---|---|---|
| 2009/0108992 A1 | 4/2009 | Shafer | |
| 2009/0179747 A1 | 7/2009 | Lin et al. | |
| 2009/0184815 A1 | 7/2009 | Suzuki et al. | |
| 2009/0207859 A1 | 8/2009 | Beshai et al. | |
| 2009/0231114 A1 | 9/2009 | Yu | |
| 2009/0267751 A1 | 10/2009 | Kaleal | |
| 2009/0291710 A1* | 11/2009 | Jheng et al. | 455/558 |
| 2009/0310477 A1 | 12/2009 | Lee et al. | |
| 2010/0308987 A1 | 12/2010 | Haas et al. | |
| 2011/0140876 A1 | 6/2011 | Deniau | |
| 2011/0181321 A1 | 7/2011 | Matsudera | |
| 2011/0211414 A1 | 9/2011 | Musha | |
| 2011/0250860 A1* | 10/2011 | Lin | 455/296 |
| 2011/0267024 A1 | 11/2011 | Halberstadt | |
| 2011/0294548 A1* | 12/2011 | Jheng et al. | 455/558 |
| 2012/0001745 A1* | 1/2012 | Li | 340/445 |
| 2012/0117788 A1 | 5/2012 | Deniau | |
| 2012/0119895 A1 | 5/2012 | Deniau | |
| 2012/0147184 A1 | 6/2012 | Siann et al. | |
| 2012/0185110 A1 | 7/2012 | Deniau et al. | |
| 2012/0274461 A1 | 11/2012 | Colombo et al. | |

FOREIGN PATENT DOCUMENTS

| | | | |
|---|---|---|---|
| DE | 19720123 | 7/1998 | |
| DE | 19924830 | 11/2000 | |
| DE | 10014076 | 10/2001 | |
| DE | 10040238 | 3/2002 | |
| DE | 10247761 | 6/2003 | |
| DE | 10217239 | 7/2003 | |
| DE | 10207014 | 8/2003 | |
| DE | 10307265 | 10/2003 | |
| DE | 69529456 | 11/2003 | |
| DE | 10247149 | 4/2004 | |
| DE | 60108973 | 7/2005 | |
| DE | 60202342 | 12/2005 | |
| DE | 60023387 | 7/2006 | |
| DE | 102005004825 | 8/2006 | |
| DE | 102005059009 | 6/2007 | |
| DE | 102007039599 | 3/2008 | |
| DE | 102008008237 | 8/2009 | |
| DE | 102008033051 | 2/2010 | |
| EP | 793579 | 9/1997 | |
| EP | 1026016 | 8/2000 | |
| EP | 1291230 | 3/2003 | |
| EP | 1428694 A2 * | 6/2004 | B60C 23/04 |
| EP | 1494877 | 1/2005 | |
| EP | 1547827 | 6/2005 | |
| EP | 1562162 | 8/2005 | |
| EP | 1026015 | 5/2006 | |
| EP | 1352763 | 4/2008 | |
| EP | 1340629 | 6/2008 | |
| GB | 2387032 | 10/2003 | |
| GB | 2420415 | 5/2006 | |
| JP | 62003537 | 1/1987 | |
| JP | 63090407 A * | 4/1988 | B60C 11/16 |
| JP | 05107134 | 4/1993 | |
| JP | 8244423 | 9/1996 | |
| JP | 2000142044 | 5/2000 | |
| JP | 2000238515 | 9/2000 | |
| JP | 2001080321 | 3/2001 | |
| JP | 2003025817 | 1/2003 | |
| JP | 2004-145474 | 5/2004 | |
| JP | 2005289116 | 10/2005 | |
| JP | 2006015832 | 1/2006 | |
| JP | 2007200081 | 8/2007 | |
| JP | 2007283816 | 11/2007 | |
| JP | 2008137585 | 6/2008 | |
| KR | 2003068216 | 8/2003 | |
| RU | 2238190 | 10/2004 | |
| WO | 9420317 | 9/1994 | |
| WO | 9422693 | 10/1994 | |
| WO | 9908887 | 2/1999 | |
| WO | 0072463 | 11/2000 | |
| WO | 0145967 | 6/2001 | |
| WO | 02094588 | 11/2002 | |
| WO | 03016079 | 2/2003 | |
| WO | 2004038674 | 5/2004 | |
| WO | 2005085651 | 9/2005 | |
| WO | 2005116603 | 12/2005 | |
| WO | 2009006518 | 1/2008 | |
| WO | 2008-103973 A1 | 8/2008 | |
| WO | 2008106387 | 9/2008 | |
| WO | 2008107430 | 9/2008 | |

OTHER PUBLICATIONS

"Motorola's MPXY8000 Series Tire Pressure Monitoring Sensors", Motorola Sensor Products Division Transportation & Standard Products Group, Motorola, Inc., May. 2003 (22 pgs.).

Alfred Pohl et al. "Wirelessly Interrogable Surface Acoustic Wave Sensors for Vehicular Applications", IEEE Transactions on Instrumentation and Measurement Vol 46, No. 4, IEEE, Aug. 1997 (8 pgs . . . ).

"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).

International Search Report and Written Opinion dated Sep. 28, 2012, from corresponding International Patent Application No. PCT/US2011/047108.

"Sony Remote Commander Operating Instructions RM-V701/V801", 1998, Sony Corporation.

"Philips Magnavox 4 Function with Back Lighted Keypad Universal Remote" Operating Instructions, printed Oct. 2012, Philips Electronics North America Corporation.

"RadioShack 8-In-One Touch Screen Remote Control", Owner's Manual, 2001, RadioShack Corporation.

KAIS MNIF, "A Smart Tire Pressure Monitoring System", Sensors Magazine, Nov. 1, 2001.

International Search Report and Written Opinion dated Sep. 28, 2012, from corresponding International Patent Application No. PCT/US2011/047112.

International Search Report dated Apr. 6, 2012, from corresponding International Patent Application No. PCT/US2011/047087.

International Search Report and Written Opinion mailed on Oct. 15, 2008, for Application No. PCT/US2008/069006.

International Preliminary Report on Patentability mailed on Jan. 14, 2010, for Application No. PCT/US2008/069006.

Chinese Office Action mailed on Apr. 19, 2011, for Chinese Application 200880023390.7 (Corresponding to PCT/US2008/069006).

Chinese Office Action (second) mailed on Feb. 16, 2012, for Chinese Application 200880023390.7 (Corresponding to PCT/US2008/069006).

Chinese Office Action (third) mailed on Oct. 10, 2012, for Chinese Application 200880023390.7 (Corresponding to PCT/US2008/069006).

Japanese Office Action mailed on Jun. 7, 2012, for JP Application 2010-515252 (Corresponding to PCT/US2008/069006).

International Search Report and Written Opinion dated Sep. 28, 2012, from corresponding International Patent Application No. PCT/US2011/047104.

Germany Office Action dated Nov. 19, 2012.

Germany Office Action dated Sep. 17, 2007.

Preliminary Invalidity Contentions of Defendant Continental Automotive Systems US, Inc.; dated Jan. 17, 2012, In the United States District Court for Western District of Virginia Lynchburg Division, Civil Action No. 6:11-CV-00014-NKM.

Amended Invalidity Contentions of Defendant Continental Automotive Systems US, Inc.; dated Jun. 18, 2012, In the United States District Court for Eastern District of Michigan Southern Division, Civil Action No. 2:12-cv-10715-SJM-MJH.

Plaintiffs' Initial Infringement Contentions; dated Dec. 15, 2011, In the United States District Court for Western District of Virginia Lynchburg Division, Civil Action No. 6:11-CV-00014-NKM-RSB.

Joint Claim Construction and Prehearing Statement, dated Jun. 11, 2012, from co-pending litigation: *Schrader-Bridgeport Int'l, Inc.* v.

(56) References Cited

OTHER PUBLICATIONS

*Continental Automotive Sys, US, Inc.*, case docket No. 2:12-cv-10715-SJM-MJH, (filed Feb. 16, 2012, E.D. Mich.).
Plaintiffs' Opening Claim Construction Brief, dated Jun. 26, 2012, from co-pending litigation: *Schrader-Bridgeport Int'l, Inc. v. Continental Automotive Sys. US, Inc.*, case docket No. 2:12-cv-10715-SJM-MJH, (filed Feb. 16, 2012, E.D. Mich.).
Translation copy of JP2003025817A, translated from Japanese by Schreiber Translations, Inc., Feb, 2013.
Jeff Burgess, "TPMS Demonstration Kit", AN1943/D, Rev 1, Apr. 2002, Motorola, Inc., 2002 (16 pgs.).

* cited by examiner

APPARATUS AND METHOD FOR ACTIVATING A LOCALIZATION PROCESS FOR A TIRE PRESSURE MONITOR

CROSS REFERENCES TO RELATED APPLICATIONS

"Tire Pressure Monitoring Apparatus and Method" having application Ser. No. 13/206,225;

"Protocol Arrangement in a Tire Pressure Monitoring System" having application Ser. No. 13/206,314; and "Protocol Misinterpretation Avoidance Apparatus and Method for a Tire Pressure Monitoring System" having application Ser. No. 13/206,358;

all of which being filed on the same date as the present application and all of which having their contents incorporated herein by reference in their entireties.

FIELD OF THE INVENTION

The field of the invention relates to tire pressure monitoring devices that utilize potentially different transmission protocols.

BACKGROUND

The pressure and other operating parameters of tires are important concerns when operating a vehicle. Not only can incorrect tire pressure (or the incorrect setting of some other tire parameter) lead to inefficient vehicle operation (e.g., the waste of fuel and other problems leading to higher operating costs), but too low a tire pressure (or an inadequate value for some other tire parameter) can lead to safety problems such as accidents. It is difficult and sometimes time-consuming for users to manually measure tire pressure (or other parameters) with a pressure gauge (or other instruments). Consequently, automatic tire pressure monitoring systems have been devised and these systems free the user from manually making tire measurements.

An automatic tire pressure monitoring device typically mounts to a wheel within the tire and wirelessly transmits information indicative of conditions within the tire. The transmissions and the order of information are typically defined by a protocol corresponding to a receiver within the vehicle. Once the receiver receives the information, the information can be processed and presented to a user. For instance, a user can be warned when the pressure in their tires is too high or too low and thus avoid safety problems. Each automobile manufacturer typically has a unique, preferred, and pre-defined protocol to meet application specific needs and applications. Consequently, receivers using one manufacturers' protocol are not responsive to transmitters operating according to other manufacturers' protocols.

Tire pressure monitors also typically need to be activated and/or initialized. Various portable tools can be used for this purpose. Unfortunately, a particular type of tire pressure monitoring device needs to operate with a tool that is compatible with that device. A user has to ensure that the two devices are compatible, or the tire pressure monitor cannot be initialized and/or activated. Consequently, a user needs to worry about compatibility issues and under some circumstances (e.g., when a mismatch is made by the user) the tire pressure monitor cannot be initialized. This results in user dissatisfaction with these previous approaches.

Figure 1:
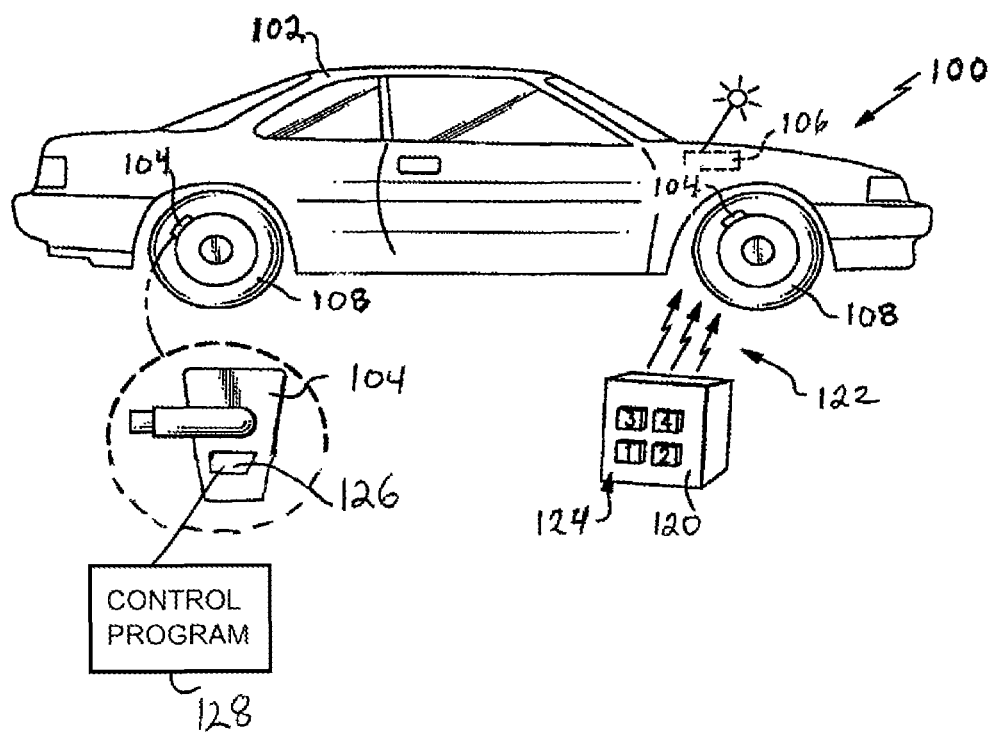
FIG. 1 comprises a block diagram of a tire pressure monitoring system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a tire pressure monitoring device can receive and recognize activation signals from a plurality of activation sources, each of these sources potentially transmitting according to different formats, different data contents, and/or different protocols. Consequently, according to the present approaches a user does not have to ensure that a particular activation device is compatible with a particular tire pressure monitor. In fact, the user can simply install the tire pressure monitor described herein and activate the device without worrying about compatibility. In one aspect, the approaches described herein can achieve compatibility in the sense that all activation devices can be accommodated. In another aspect, a subset of all possible activation devices can be accommodated, such as the most popular devices to mention one example. By "activation" and as used herein it is meant that a process is executed upon the tire pressure monitor being "activated." For example, a localization process can be executed. In another example, a control program that transmits RF frames can be executed. Other examples are possible.

In many of these embodiments, a receiver device is tuned to monitor first transmissions at a first time according to a first criterion and to monitor transmissions at a second time according to a second criterion. When the receiver device initially recognizes one of the first transmissions being transmitted according to the first criterion or the second transmissions being transmitted according to the second criterion, the recognized transmission is verified as being valid or authentic. When the transmission is recognized as valid or authentic, an indication is sent to a receiver (e.g., a control unit in a vehicle) and this is effective to activate a localization process that in turn ensures that tire pressure monitoring information can be correlated to a particular tire (with a known identifier) at a known location.

In one aspect, the first criterion describes a low frequency (LF) sinusoidal waveform and the second criterion describes a low frequency (LF) transmission of a predetermined data pattern. Other examples are possible. In another aspect, the verifying includes verifying that the recognized transmission is received for a predetermined time period.

In other aspects, the sensitivity of the receiver device in the monitor can be dynamically adjusted. For example, it can be lowered when the vehicle is not moving and increased when the vehicle is moving.

The transmission of the tire pressure information may be accomplished in a variety of different ways. For instance, a control program may be executed to transmit the tire pressure information according to each of a plurality of communications formats incorporated into the control program and not according to a manufacturers' code. Transmissions may be made according to each and every possible manufacturers' protocol or a subset of these protocols. Other examples of transmission approaches are possible.

In others of these embodiments, an apparatus (e.g., a tire pressure monitor) includes a receiver device, a transmitter apparatus, and a controller. The receiver device is configured to receive first transmission and second transmissions from an activation source or sources.

The controller is coupled to the transmitter apparatus and the receiver device. The controller is configured to tune the receiver device to monitor first transmissions at a first time according to a first criterion and to monitor transmissions at a second time according to a second criteria. The controller is further configured to when the receiver device initially recognizes one of the first transmissions being transmitted according to the first criterion or the second transmissions being transmitted according to the second criterion, to verify that the recognized transmission is valid. The controller is still further configured to when the transmission is recognized as valid, send an indication to a receiver so that a localization process can be accomplished. Once the localization process is accomplished, tire pressure information that is sent can be associated with a monitor at a known location.

Thus, approaches are provided where a tire pressure monitoring device can receive and recognize activation signals from a plurality of sources, each of these sources potentially transmitting according to different formats, different data contents, and/or different protocols. Consequently, according to the present approaches a user does not have to ensure that a particular activation device is compatible with a particular tire pressure monitor and the user can simply install the monitor and automatically activate the localization process associated with the device without concerns about compatibility.

Referring to FIG. 1, a tire pressure monitoring system 100 is shown assembled within a vehicle 102. The system 100 includes a receiver 106 that receives communications from tire pressure monitoring devices 104 ("monitors") assembled within each of the vehicle's tires 108. The receiver 106 may be any communication device configured to receive any type of transmitted communication but tuned to only recognize some of these communications. In one example, these communications are radio frequency (RF) communications, but other types of communications are also possible.

Although the device 104 is described as a tire pressure monitoring device herein, it will be appreciated that this device can gather and transmit other types of information related to the tire in addition to or in place of tire pressure information. For example, the information can include temperature information, acceleration information, or information related to the wear of the treads of the tire. Appropriate sensors or sensing devices may be used to obtain this information. Other examples of information may also be gathered by the tire pressure monitoring device 104.

Each of the tire pressure monitoring devices 104 are assembled within the tires 108 of the vehicle 102 and, as mentioned, communicate information indicative of conditions within the tires 108 to the receiver 106. These conditions include temperature, pressure, and/or any other desired information that aids in the evaluation of tire conditions. Other examples of conditions may also be sensed.

The system 100 includes the tire pressure monitoring devices 104 that in this example includes a memory device 126. The memory device 126 is utilized for the storage of a control program 128. The control program 128, once compiled and executed, transmits sensed information (e.g., tire pressure information) according to one or more protocols (or formats) that govern operation and communication between the tire pressure monitoring device 104 and the receiver 106. Examples of communication protocols that may be used include protocols that specify the frequency and timing of transmissions from the tire pressure monitoring device 104 to the receiver 106 or the format of transmission (such as what constitutes a "1" or a "0," modulation type, error detection and/or correction content, synchronization pattern, and so forth to name but a few examples in these regards). Tire pressure monitoring information may be transmitted according to the protocols sequentially (e.g., using the same antenna) or at the same time (e.g., using different antennas). No separate manufacturers' codes are used in making the transmissions. Once the control program is compiled, the protocols that have been selected cannot be changed without changing (e.g., editing, compiling, and installing anew) the control program 128. In one aspect, the control program 128 is compiled and stored in the memory 126 during manufacturing.

In one aspect, the control program 128 may be executed continuously whenever the vehicle is moving. The control program 128 may also be executed when the vehicle is not moving, but only when the sensor is activated externally (i.e., via LF or grounding of a pin on the ASIC during manufacturing). At other times, it may not be executed. However, learning the identities of the devices 104 and/or determining where each device is located ("localization", e.g., front left, front right, and so forth) may be accomplished by using an activation device 120. The activation device 120 emits a wireless signal 122 (e.g., an LF signal) that is received by a corresponding one of the tire pressure monitoring devices 104. Receipt of the wireless signal 122 causes the device 104 to transmit identity information and also indicate to the receiver 106 that the device 104 has received an LF signal and that the localization process can occur. When the vehicle is moving, LF transmitters (e.g., antennas) may transmit LF signals (in place of the device 120). When moving, the RF signals are periodically being transmitted and when the device 104 finds an LF signal, it so indicates to the receiver 106 (e.g., by flipping a bit in the RF transmission). Once this indication is received, localization can be completed (e.g., this process may occur for a predetermined amount of time to ensure that the device 104 is correctly localized). Once localization is complete, tire pressure information can be associated with a known tire. It will be appreciated that in other examples, the control program may itself be activated by the LF signals.

The activation device 120 includes a series of selectable buttons 124 (or other types of actuators) that are actuated by a user to indicate that they wish to activate the tire pressure monitoring device. Although the example device 120 is shown with buttons, other display and selection configurations, such as touch screens, switches or some other selection interface may be used as will be appreciated by those skilled in the art. Accordingly, installation of the multi applications tire pressure monitoring devices 104 optionally includes the initial step of physically activating the tire pressure monitoring devices 104 within each of the corresponding tires 108 or activate a localization process that allows tire pressure data to be associated with particular tires.

If an activation device is used, the activation device 120 is placed proximate to each of the tire pressure monitoring devices 104 to send a signal 122. In one example, the signal 122 is a low frequency transmission received by the proximate tire pressure monitoring device 104.

The devices 104 operate with the receiver 106 in the vehicle and the receiver 106 typically has a display (or some sort of user interface) that is configured to alert the driver when the tire pressure falls below a predetermined threshold value. As mentioned, once physically installed in the tire, the devices 104 are first "learned" by the control unit. During this process, the receiver 106 determines the particular identifiers and during or after learning, a localization process may be executed in which each of the devices 104 is associated with a particular tire.

During normal operation (after the sensors are learned and localized and the vehicle is moving), the device 104 senses the tire pressure and sends a radio frequency (RF) signal to the receiver 106 indicating the tire pressure. The receiver 106 can then determine if a pressure problem exists. If a problem exists, the user can be alerted so that appropriate action can be taken. As mentioned, this is all accomplished by use of a control program that is compiled, translated, and/or assembled before it is executed. In one aspect, once compiled the structure of the control program (e.g., the protocols selected) can not be changed. Also, nothing external to the device can be input into this control program to change the structure of the control program once the control program (and the protocols specified in the control program) is compiled. It will be appreciated that although many of the examples described herein refer to a control program being executed to transmit RF frames with tire pressure information, that other approaches can also be used. For instance, systems that utilize manufacturers' codes can also have their monitors localized according to the approaches described herein.

The devices 104 can also receive indications as to whether the vehicle is moving. For example, a signal can be sent from the control unit of the vehicle with this information.

Figure 2:
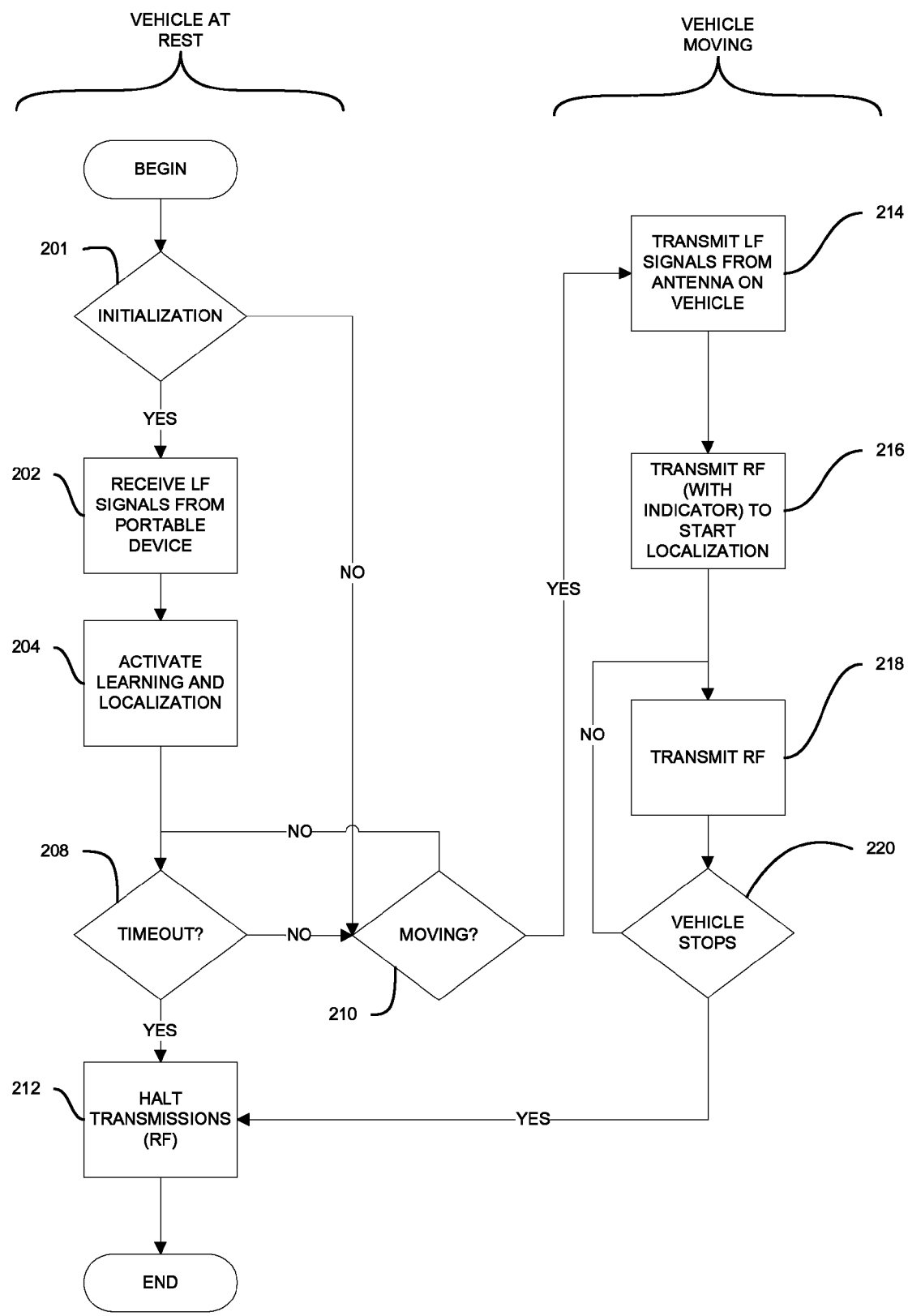
FIG. 2 comprises a flowchart showing one example of an approach for initializing and/or activating a tire pressure monitor according to various embodiments of the present invention.

Referring now to FIG. 2, one example of an approach for operating a tire pressure monitoring system is described. At step 201, it is determined if the user is attempting to initialize the sensor. If the answer is affirmative, step 202 is performed and if the answer is negative, step 210 is performed. At step 202, LF signals are received from an external activation source. The external source may be a portable or fixed device. The received signals may be sinusoidal signals of a predetermined frequency (CW) or be modulated to include information (e.g., bytes of information). Signals other that LF signals may also be used. The device verifies that the signals are what was expected. When verified, an indicator is transmitted to a receiver (e.g., a control module) that informs the receiver that the monitor has received and verified LF reception.

In another aspect, the type of signals received may affect the operation of the monitor. For instance if LF CW signals are received, bursts have certain formats may be sent. Other examples are possible.

At step 204 and upon verification, the learning process and localization process are performed. Learning refers to obtaining the identifier of a monitor and localization refers to determining where the monitor is located (e.g., front right wheel, front left wheel and so forth). The indicator transmitted by the monitor may be an RF signal of a burst of frames whereby selected ones of the frames include tire pressure information and where a specified predetermined bit is flipped (from a "0" to a "1", or vice versa) to indicate LF was verified at the monitor. It will be appreciated that the monitor may attempt to verify reception of LF signals a predetermined number of times to ensure that the signal is valid.

At step 208 it is determined if a timeout has occurs (e.g., has a certain period of time passed so that RF transmissions can be halted). If the answer is affirmative, at step 212 transmissions are halted. If the answer is negative, execution continues at step 210 where it is determined whether the vehicle is moving.

If the answer at step 210 is negative, execution continues at step 208 as has been described above. If the answer is affirmative, then at step 214 LF signals are received from LF antennas at the vehicle and are verified as being valid activation signals.

At step 216, an indicator is sent to the receiver to indicate that the monitor has received valid LF signals and the localization process is activated at the receiver (e.g., the vehicle controller). At step 218, the RF transmissions are made and tire pressure information can be associated with a particular monitor at a known location. At step 220, it is determined if the vehicle is stopped, in one example if it has been stopped for a predetermined period of time (e.g., 15 minutes). If the answer is negative, execution continues at step 218 and if the answer is affirmative execution continues at step 212.

Figure 3:
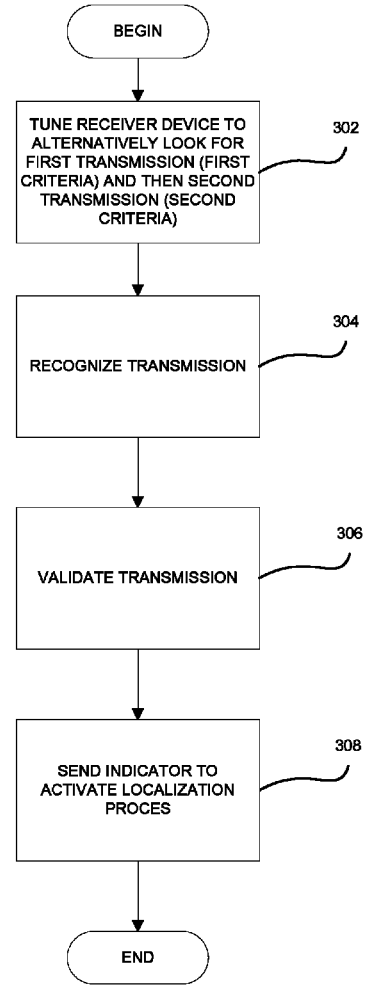
FIG. 3 comprises a flowchart showing one example of an approach for initializing and/or activating a tire pressure monitor according to various embodiments of the present invention.

Referring now to FIG. 3, one approach for activating a tire pressure monitor is described. At step 302, a receiver device is tuned to monitor first transmissions at a first time according to a first criterion and to monitor transmissions at a second time according to a second criterion. In one aspect, the first criterion describes a low frequency (LF) sinusoidal waveform and the second criterion describes a low frequency (LF) transmission of a predetermined data pattern. In another aspect, the verifying includes verifying that the recognized transmission is received for a predetermined time period.

At step 304, when the receiver device initially recognizes one of the first transmissions being transmitted according to the first criterion or the second transmissions being transmitted according to the second criterion. At step 306, the transmission is recognized as valid and at step 308 an indication is sent to the receiver that the monitor has received a valid LF activation signal and that the localization process can be executed.

After step 308 is accomplished, the tire pressure information can be associated with a known monitor that is at a known location. Consequently, reports can be generated to the user that alert the user when a tire becomes deflated, for example. It will be appreciated that in one aspect tire pressure information can be transmitted periodically when the vehicle is moving. However, it is only after localization is completed that this information can be linked with a monitor that resides at a known location. As used herein, "monitor" refers to the tire pressure monitor such as one of the devices 104 in FIG. 1 or the device 400 of FIG. 4.

Figure 4:
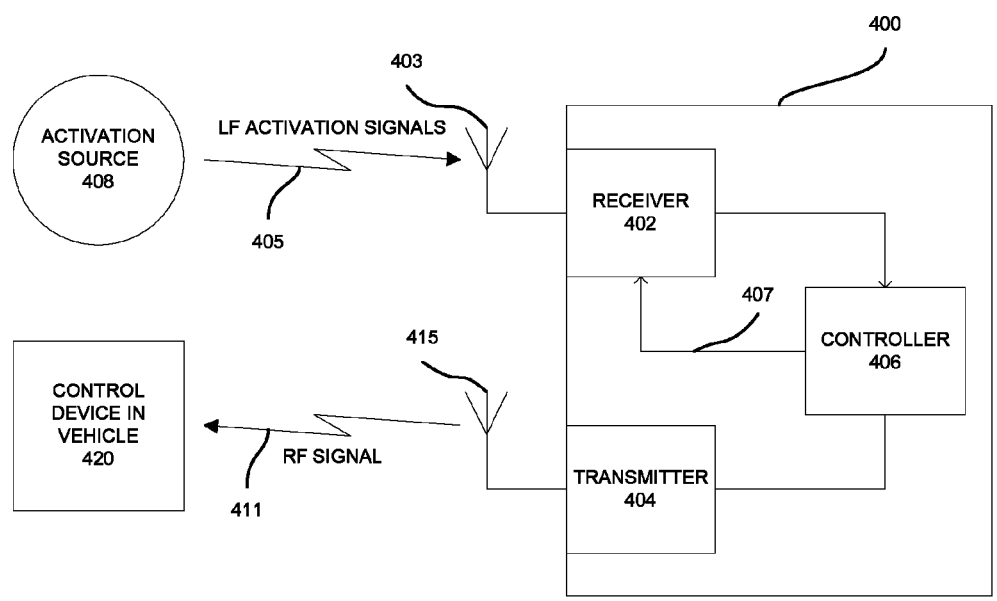
FIG. 4 comprises a block diagram of a tire monitor according to various embodiments of the present invention.

Referring now to FIG. 4, an apparatus 400 (e.g., a tire pressure monitor) for initializing a tire pressure monitor includes a receiver device 402, a transmitter apparatus 404, and a controller 406. The receiver device 402 is configured to monitor for first transmission and second transmissions having predetermined formats (that may be present in activation signals 405) received from an activation source or sources 408 via the antenna 403.

The controller 406 is coupled to the transmitter apparatus 404 and the receiver device 402. The controller 406 is configured to tune the receiver device 402 using control signals 407 to monitor for first transmissions at a first time according to a first criterion and to monitor for second transmissions at a second time according to a second criterion. The controller 406 is further configured to when the receiver device 402 initially recognizes one of the first transmissions being transmitted according to the first criterion or the second transmissions being transmitted according to the second criterion, to verify that the recognized transmission is valid (e.g., it matches predetermined requirements such as being of a particular frequency, having a particular value, having a predetermined power level, and so forth). The controller 406 is still further configured to when the transmission is recognized as valid, activate the transmission apparatus 404 to transmit an indicator (e.g., a flipped bit in an RF signal 411) via the antenna 415. This information 411 is transmitted to a vehicle receiver or controller 420 where it may be further processed as described above to initiate the localization process. Although the device 400 may be periodically broadcasting tire pressure information when the vehicle is moving (e.g., in bursts of frames transmitted every approximately 17 seconds) it is only after the localization process is complete that the tire pressure information can be associated with a known tire.

In another aspect, the sensitivity of the LF reception by the receiver device can be adjusted, i.e., it has a dynamic sensitivity. For example, the sensitivity can be lowered when the vehicle is at rest. This may be done, for example, so that when the vehicle is stopped spurious LF signals (e.g., caused by other electronic devices) are not confused as being valid signals. The sensitivity can be increased when the vehicle is moving since there is less of a chance of detecting spurious signals when the vehicle is moving down a roadway.

Figure 5:
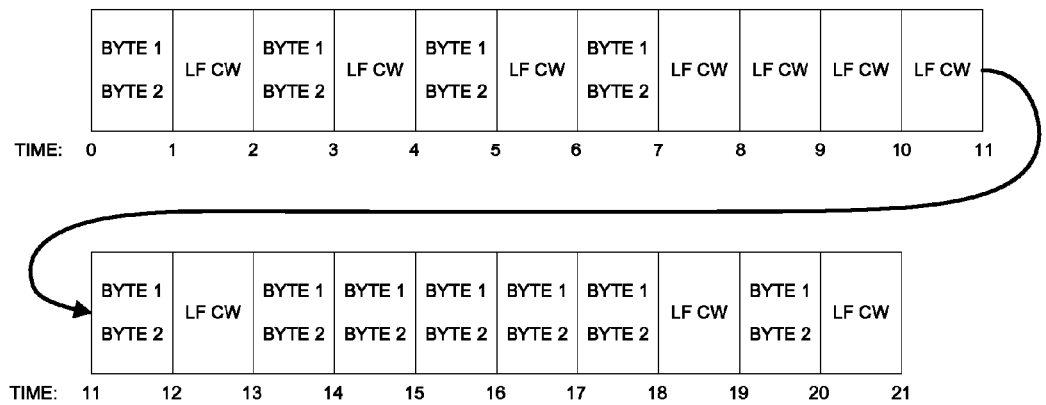
FIG. 5 comprises a block diagram of timeline showing sensing patterns for a receiver device according to various embodiments of the present invention.

Referring now to FIG. 5, one example of how a receiver device (e.g., device 402 in FIG. 4) in a monitor is tuned is described. FIG. 5 shows an x-axis that represents time and the time units are expressed in arbitrary units (0, 1 . . . 23). Each time period includes the criteria that a controller (e.g., controller 406 of FIG. 4) has tuned a receiver device (e.g., device 402 of FIG. 4) to listen. For example, between time 0 and 1, the receiver device in the monitor is tuned to listen for LF signals that have a data content of byte 1 and byte 2. Between time 1 and 2, the receiver device in the monitor is tuned to listen for a low frequency (LF) sinusoidal signal (CW). It will be appreciated that these are examples only and that other types of signals can be listened for and in different orders.

Between times 8 and 9, the controller identifies the received transmission as an LF CW transmission. Between time 9 and 12 the receiver device in the monitor is configured to verify this is a valid transmission by listening for the LF CW pattern. For example, the receiver device in the monitor ensures that this is not a noise signal by verifying a constant frequency and/or amplitude to take one example, At time 12, the transmission of RF signals (e.g., using a control program) is enabled. The receiver device in the monitor then alternates between checking/listening for the byte pattern and LF CW patterns described above.

At times 16 and 17, the controller identifies the received transmission as one of the byte patterns byte 1 or byte 2. Between time 17 and 20 the receiver is configured to verify this is a valid transmission by listening for byte 1 or byte 2. For example, the receiver device ensures that this is not a noise signal by verifying that the values of byte 1 or byte 2 do not change. At time 20, the transmission of RF signals (e.g., using a control program) is enabled. The receiver device then alternates between checking for the byte pattern and LF CW patterns described above.

It will be appreciated that in this example the LF CW may be transmitted by one type of activation device (e.g., from a first manufacturer) while the LF byte transmissions are transmitted by another type of activation device (e.g., from a second manufacturer). However, these approaches are applicable to any number of possible received formats and are not limited to two as shown here. The byte patterns may be any byte pattern as is known to those skilled in the art.

It should be understood that any of the devices described herein (e.g., the programming or activation devices, the tire pressure monitoring devices, the receivers, the transmitters, the sensors, the presentation devices, or the external devices) may use a computing device to implement various functionality and operation of these devices. In terms of hardware architecture, such a computing device can include but is not limited to, a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or non-volatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of initializing a tire pressure monitor, the method comprising:
   tuning a receiver device at a wheel unit to monitor for first transmissions from an initiation source during a first predetermined time period, the first transmissions being made according to a first criterion;
   tuning the receiver device at the wheel unit to monitor for second transmissions from the initiation source during a second predetermined time period according to a second criterion and not according to the first criterion, the second criterion being different than the first criterion;
   when the receiver device at the wheel unit initially recognizes one of the first transmissions being transmitted according to the first criterion or the second transmissions being transmitted according to the second criterion, at the receiver device at the wheel unit verifying that the recognized transmission is valid by comparing the recognized transmission to an expected information pattern;
   in response to verifying at the receiver device the recognized transmission is valid, sending an indication from the receiver device to a central receiver unit in the vehicle so that a localization procedure can be executed.

2. The method of claim 1 wherein the first criterion describes a low frequency (LF) sinusoidal waveform.

3. The method of claim 2 wherein the second criterion describes a low frequency (LF) transmission of a predetermined data pattern.

4. The method of claim 1 wherein the verifying comprises verifying that the recognized transmission is received for a predetermined time period.

5. The method of claim 1 further comprising transmitting the tire pressure information.

6. The method of claim 5 wherein the transmitting comprises executing a control program to transmit the tire pressure information according to each of a plurality of communications formats incorporated into the control program and not according to a manufacturers' code.

7. The method of claim 1 further comprising transmitting one of the first transmissions or the second transmissions from a portable tool.

8. The method of claim 1 further comprising transmitting one of the first transmissions or the second transmissions from an antenna at a vehicle.

9. The method of claim 1 further comprising dynamically adjusting the sensitivity of the receiver device.

10. The method of claim 9 wherein the sensitivity is lowered when the vehicle is at rest and is increased when the vehicle is moving.

11. An apparatus for initializing a tire pressure monitor, the apparatus being disposed at a wheel unit, the apparatus comprising:
    a receiver device, the receiver device configured to receive first transmission and second transmissions;
    a transmission apparatus;
    a controller coupled to the transmitter apparatus and the receiver device, the controller configured to tune the receiver device to monitor for first transmissions from an initiation source during a first predetermined time period according to a first criterion and configured to tune the receiver device to monitor for second transmissions from the initiation source during a second predetermined time period according to a second criterion and not according to the first criterion, the second criterion being different than the first criterion, the controller further configured to when the receiver device initially recognizes one of the first transmissions being transmitted according to the first criterion or the second transmissions being transmitted according to the second criterion, to verify that the recognized transmission is valid by comparing the recognized transmission to an expected information pattern, the controller further configured to when the transmission is recognized as valid, transmit an indicator to a receiver in a vehicle so that a localization process can be executed to determine a location of the apparatus.

12. The apparatus of claim 11 wherein the first criterion describes a low frequency (LF) sinusoidal waveform.

13. The apparatus of claim 11 wherein the second criterion describes a low frequency(LF) transmission of a predetermined data pattern.

14. The apparatus of claim 11 wherein the controller is configured to verify that the recognized transmission is received for a predetermined time period.

15. The apparatus of claim 11 further comprising transmission apparatus is configured to transmit the tire pressure information.

16. The apparatus of claim 15 wherein the controller is configured to execute a control program to transmit the tire pressure information according to each of a plurality of communications formats incorporated into the control program and not according to a manufacturers' code.

17. The apparatus of claim 11 wherein the first transmissions or the second transmissions are received from a portable tool.

18. The apparatus of claim 11 wherein the first transmissions or the second transmissions are received from an antenna at a vehicle.

19. A computer usable non-transitory medium having a computer readable program code embodied therein, said computer readable program code adapted to be executed to implement a method of initializing a tire pressure monitor information, the method comprising:
    tuning a receiver device at a wheel unit to monitor for first transmissions from an initiation source during a first predetermined time period according to a first criterion;
    tuning the receiver device at the wheel unit to monitor for second transmissions from the initiation source during a second predetermined time period according to a second criterion and not according to the first criterion, the second criterion being different than the first criterion;
    when the receiver device at the wheel unit initially recognizes one of the first transmissions being transmitted according to the first criterion or the second transmissions being transmitted according to the second criterion, verifying that the recognized transmission is valid by comparing the recognized transmission to an expected information pattern;
    in response to verifying at the receiver device the recognized transmission is valid, sending an indication from the receiver device to a receiver in a vehicle so that a localization procedure can be executed.

20. A computer usable non-transitory medium having a computer readable program code embodied therein, said computer readable program code adapted to form the following means when executed on a computer:
    means for tuning a receiver device at a wheel unit to monitor for first transmissions from an initiation source during a first predetermined time period according to a first criterion and to monitor for second transmissions from the initiation source during a second predetermined time period according to a second criterion and not according to the first criterion, the second criterion different than the first criterion;

means for verifying that the recognized transmission is valid, when the receiver device at the wheel unit initially recognizes one of the first transmissions being transmitted according to the first criterion or the second transmissions being transmitted according to the second criterion;

means for sending an indication to a receiver so that a localization procedure can be executed, when the transmission is recognized as valid by comparing the recognized transmission to an expected information pattern.

* * * * *